June 10, 1924.

F. A. WHITE 1,497,127

CONTROLLING DEVICE FOR MOTOR VEHICLES

Filed March 10, 1924

Inventor
Fred A. White

By Bacon & Thomas
Attorneys

Patented June 10, 1924.

1,497,127

UNITED STATES PATENT OFFICE.

FRED A. WHITE, OF NEW LONDON, CONNECTICUT.

CONTROLLING DEVICE FOR MOTOR VEHICLES.

Application filed March 10, 1924. Serial No. 698,327.

*To all whom it may concern:*

Be it known that I, FRED A. WHITE, a citizen of the United States, residing at New London, in the county of New London and State of Connecticut, have invented certain new and useful Improvements in Controlling Devices for Motor Vehicles, of which the following is a specification.

The invention relates to improvements in mechanism for automatically stopping the movement of a motor vehicle should the operator become unconscious through sickness or for any other reason.

It is an object of the invention to provide a mechanism whereby when the operator releases control of a steering wheel of a vehicle the ignition circuit is instantly broken and thereafter in a very short interval the brakes of the vehicle are automatically applied to arrest the movement thereof.

Figure 1:
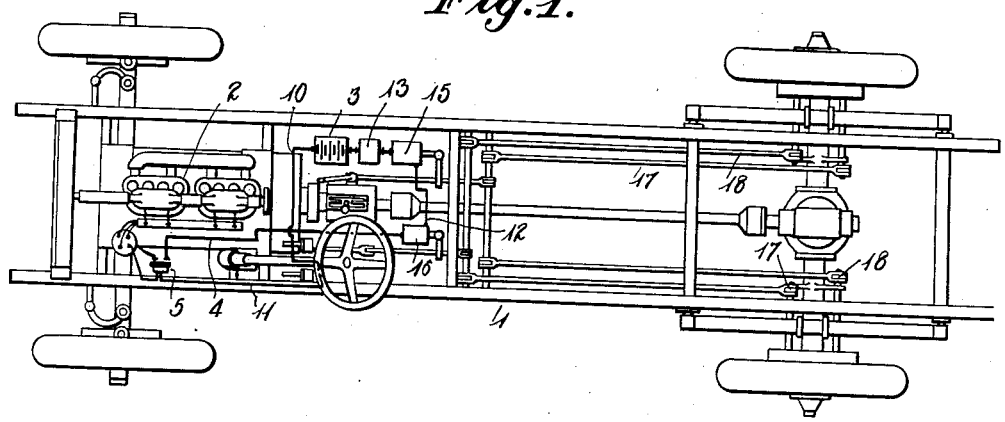
Figure 2:
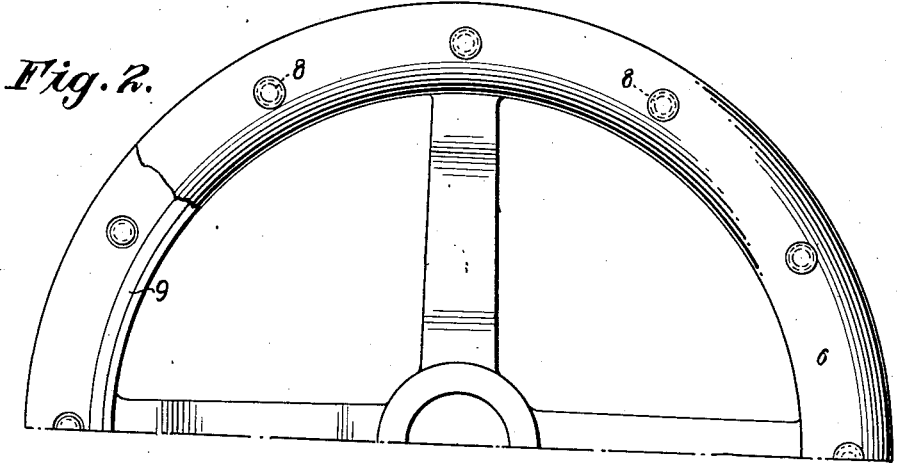
Figure 3:
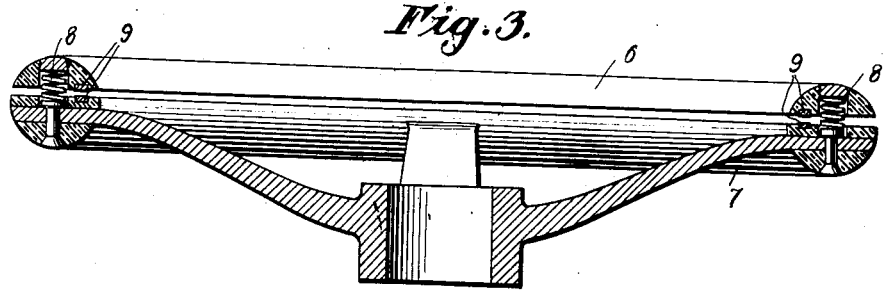

In the accompanying drawings I have shown the preferred embodiment of my invention wherein Figure 1 represents a diagrammatic showing and, Figures 2 and 3 detail views.

Referring now more particularly to the drawings the numeral 1 designates a motor vehicle having the usual engine 2, provided with the conventional ignition circuit, including the battery 3 and the feed wire 4 leading to the distributor 5 in communication with the plugs of the car. The steering wheel is constructed of two separable sections 6 and 7, being normally urged apart by means of the spring 8 disposed within the sockets in one section of the wheel as clearly shown in my co-pending application, Serial No. 679,961. Contacts 9 are provided on the meeting surfaces of said sections 6 and 7 so that when the wheel is grasped a circuit is completed by reason of the wire 10 leading to one contact and the wire 11 leading from the other. As long as the operator grasps the wheel the sparking plugs are therefore in circuit and the engine runs in the normal way. Should, however, the wheel be released by the operator for any reason, such as sickness or the like, the springs 8 will separate the wheel sections and break the contacts 9. These will instantly break the circuit in which the plugs are included so that the engine will stop.

My invention further comprehends means for applying the vehicle brakes shortly after the stopping of the engine. This I accomplish through the wiring 12 shown in Figure 1, which is also in circuit with the battery 3, but in which circuit there is interposed a time relay 13 that can be set to actuate the brakes any definite time after the release of the steering wheel, say for instance, from 30 seconds to 2 minutes.

This time relay is of the conventional type and need not be herein shown in detail. After the expiration of the time for the relay is set, the current passes on to the magnets 15 and 16 suitably mounted on the vehicle, the armature of the magnet 15 being connected by links and levers of the emergency wheel brakes 17, while the armature of the magnets 16 is likewise connected through the medium of levers with the actuating mechanism for the rear brakes 18. It is therefore clear that under the operation of the time relay, if the steering wheel sections 6 and 7 are still separated, that the magnets 15 and 16 will become energized, attracting their armatures, which in turn actuate the mechanism for both the front and rear brakes and arrest the movement of the car.

I have not shown in detail the construction of the brakes, the relay, nor other parts of the apparatus because conventional mechanism is used and my invention consists in the circuit arrangement whereby upon the release of the steering wheel the ignition is instantly cut off, and at a short period after such control of the ignition the brakes are placed in operation to arrest the movement of the vehicle.

Having thus described my invention, what I claim is:

In a controlling device of the character described, the combination with a motor vehicle having an engine, a battery and an ignition circuit between said engine and said battery, a steering wheel, said wheel having separable sections, contacts adapted to be closed when said steering wheel sections are grasped by an operator and to be opened when released, brakes for said vehicle, solenoids for operating said brakes and a time relay in the circuit from said steering wheel and said solenoids for permitting the solenoids to be energized in a given period of time after the release of the steering wheel.

In testimony whereof I affix my signature.

FRED A. WHITE.